Figure 1:
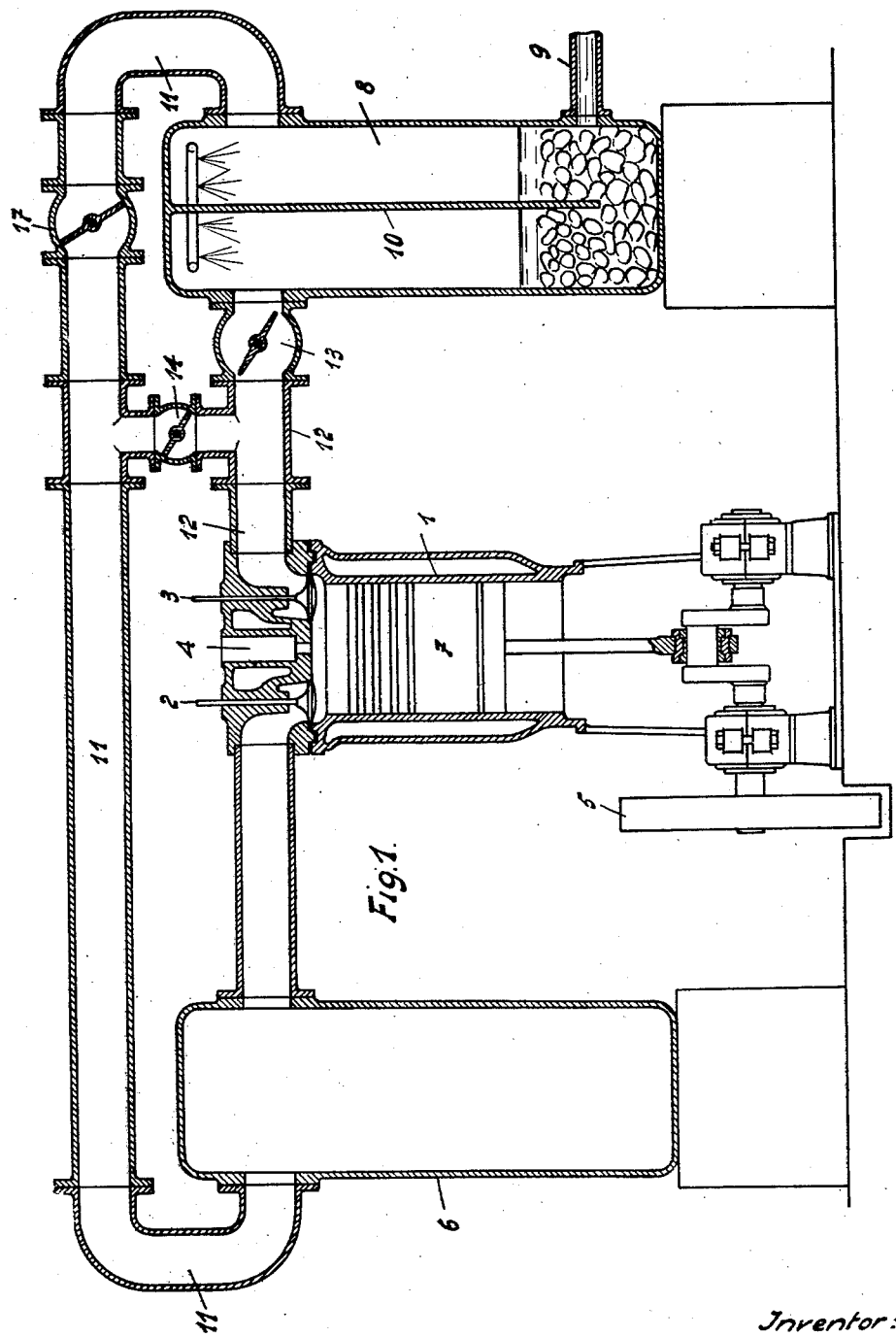

Nov. 17, 1931.　　　M. BRUTZKUS　　　1,832,762
SYNTHESIS OF ORGANIC BODIES SUITABLE FOR AUTOMOBILE
ENGINES FROM WATER GAS OR SIMILAR GASES
Filed March 20, 1925　　2 Sheets-Sheet 1

Nov. 17, 1931.   M. BRUTZKUS   1,832,762
SYNTHESIS OF ORGANIC BODIES SUITABLE FOR AUTOMOBILE
ENGINES FROM WATER GAS OR SIMILAR GASES
Filed March 20, 1925   2 Sheets-Sheet 2

Patented Nov. 17, 1931

1,832,762

UNITED STATES PATENT OFFICE

MARCUS BRUTZKUS, OF PARIS, FRANCE

SYNTHESIS OF ORGANIC BODIES SUITABLE FOR AUTOMOBILE ENGINES FROM WATER GAS OR SIMILAR GASES

Application filed March 20, 1925, Serial No. 17,078, and in France December 23, 1924.

It is known that starting with water gas at a high pressure and at temperatures of 400 to 450° C. with the use of suitable catalysts, it is possible to effect the synthesis of organic bodies adapted to be burnt as fuel in automobile and aeroplane engines. But in these known processes there are obtained such insignificant quantities of organic bodies that these synthetic processes of producing organic bodies have not yet been carried out on a commercial scale.

The aqueous and oily liquids obtained by this synthesis contain a large amount of methyl alcohol, and higher alcohols, aldehydes, ketones, and acids of not more than eight atoms of carbon. Non-oxygenated hydrocarbons have not been found in the products of this synthesis. It is admitted that this synthesis of these organic bodies commences by the formation of formaldehyde according to the following theoretical equations:

1. $CO + H_2 = HCHO$.
2. $2HCHO = CH_3OH + CO$.
3. $CH_3OH + CO = CH_3COOH$.
4. $CH_3COOH + 2H_2 = C_2H_5OH + H_2O$.

The combination of ethyl alcohol with carbonic oxide gives acid of a higher power than propylic acid etc., it is admitted that the aldehydes and the ketones which are found amongst the products are formed by the hydrogenation of the corresponding acids. Moreover the more complex alcohols may be formed from simple alcohols particularly in the presence of strong alkalies. As this synthesis is effected with the assistance of a catalyst (usually this catalyst is formed by the chips of iron impregnated with KOH) which is very sensitive to the compounds of sulphur it is necessary for the water gas to be well purified from any compound of sulphur.

The present invention has for its object a process of synthesis of organic bodies suitable for burning in automobile engines from water gas or other similar gases. This process is based on a new general chemico-technological principle and in the use for this purpose of an apparatus in the form of a compressor.

This chemico-technological principle has been established and demonstrated experimentally by the applicant on reactions of combustion in internal combustion engines. This principle follows from the fact that:

"Any chemical reaction can be directed and accelerated in the desired direction by continuous and simultaneous external variations in pressure, temperature and concentration, these variations being produced in a direction opposite to that of the variations produced by the desired reaction".

The production of the chemical reactions according to this principle is possible by using for this purpose a compressor preferably in the form of a Diesel engine.

The reactions which take place in this synthesis are explained above:

As is shown in the above equations of the formation of organic bodies from water gas, all the reactions which take place have the following characteristic features.

1. All these reactions, except reaction 2, are combined with a great reduction in the number of molecules. In accordance with the above chemico-technological principle, these reactions should be effected under the action of a continually increasing pressure.

2. As shown by the calculation of the heat of formation all the above reactions (except the first) are exothermic reactions. They should be effected simultaneously with energetic cooling.

3. These synthetic reactions are attendant with an absorption of the gases CO and H and consequently their partial pressures continually decrease. According to the above principle these reactions should be effected under the influence of a continuously increasing concentration of these gases.

It follows that the reaction of the synthesis of these organic bodies from water gas should be effected at a continually increasing pressure while continually lowering the temperature and continuous increase of the concentration of the gases H and CO.

The variations in the direction necessary for the three factors of chemical equilibrium during the reaction may be effected in the apparatus shown by way of example in Fig. 1 of the accompanying drawings.

The compressor 1 of this apparatus is constructed entirely as a Diesel engine already described in my American Patent No. 1,586,508 May 25, 1926. This apparatus only differs from a Diesel engine by the pulley 5 which is mounted on the main shaft of the compressor. The compressor can be driven by this pulley.

This compressor like a Diesel engine, is provided with an auxiliary pump. This pump compresses the water gas to a pressure much higher than the pressure of the gas in the cylinder.

The auxiliary pump of the Diesel engine for the fuel may be omitted in this case but when working at a high temperature it is possible to use it for the injection of water into the cylinder for increasing the cooling of the gas.

These two pumps are entirely constructed like the corresponding pump in a Diesel engine. They are not shown in Fig. 1.

The compressor 1, like a Diesel engine, is provided with three valves as follows:

1. The inlet valve 2 through which the gas from the tank 6 enters the cylinder.

2. The spraying valve 4 through which a jet of gas, at a pressure higher than the pressure of the gas in the cylinder enters as a spray into the cylinder for increasing the concentration of the gases in the compressor and for thoroughly cooling them. This gas is compressed by the auxiliary pump.

3. The exhaust valve (3) through which the products obtained escape into the tank 8.

All these valves are constructed like the valves of a Diesel engine and are actuated by distribution shafts so as to operate on the two or four stroke cycles.

The products obtained pass into the tank 8 where they are cooled and liquefied. The liquefied products leave the apparatus by the pipe 9 and the non-absorbed gases and the permanent gases formed by the process again enter by way of the tank 6 and the pipes 11 for the purpose of being again treated.

During the working of the compressor it is possible to regulate the temperature in the tank 6 by the valves 13 and 14, allowing a portion of the gas to enter the tank directly without cooling. By means of the valve 17 it is possible to interrupt the communication between the tank 6 and the tank 8. It will be understood that the tank 6 should be filled continuously with gas in proportion as the gases are absorbed during the procedure of the process. Care should also be taken that the gas in the tank is of constant composition. Sometimes it is more practicable to interrupt the communication of the tank 8 with the tank 6 directly. Then the gas not absorbed can be conducted from the tank 8 to the tank 6 by a special compressor which sucks the gases from the tank 8 and causes them to escape into the tank 6.

Figure 2:
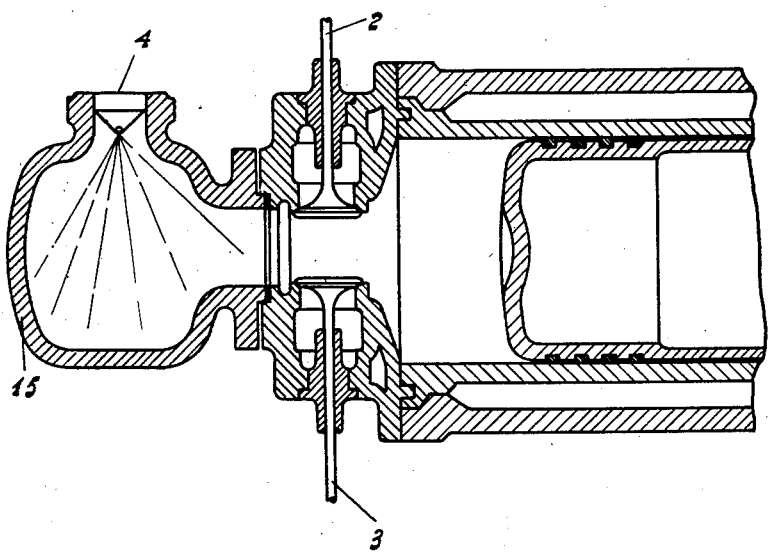

In Fig. 2 is shown a modification of the compressor 1. This modification differs from the compressor in Fig. 1 by a special reaction chamber 15, of which the walls may be cooled directly from the outside. If the operation is carried out with a catalyst this may be placed in this special chamber.

Figure 3:
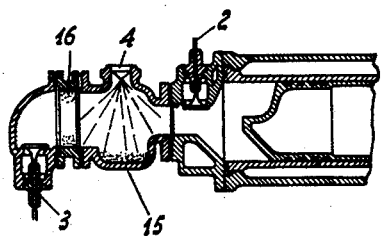

Fig. 3 shows a further modification of the compressor 1, particularly constructed for operation with a catalyst. In this modification the reaction chamber is terminated by the pipe section 16 where the catalysts may be placed between metal sets. The exhaust valve is placed in this compressor behind the section 16, and also in the chamber as shown at 15. The gases are thus caused to pass through the layer of catalyst. In Figs. 2 and 3 the valves are indicated by the same references as the corresponding valves of the compressor in Fig. 1.

In the apparatus above described the synthesis of the organic body without a catalyst may be effected in two stages in the following manner:

1. First stage: The piston 7 moves towards the outside and the water gas which is in the tank 6 fills the cylinder 1 of the compressor. The gas has for example a temperature of 62° C. and a pressure of 4 atmos.

2. Second stage: The piston moves towards the interior and compresses the gas enclosed for example during 3/4 of its return stroke. At this moment the valve 4 opens and a jet of gas, quite cool, of a pressure of 200 atmos. enters the cylinder. This jet of gas in view of its low temperature and particularly by its expansion in the cylinder thoroughly cools the enclosed gas. At the same time this jet of water gas increases the concentration of the water gas in the cylinder. This gas at high pressure is supplied by the auxiliary pump of the compressor.

Without cooling and without the admission of the jet of gas the final temperature and pressure will be 700° C. and 140 atmos. calculated by the formulæ of adiabatic pressure, when the compression space is 8% of the cylinder.

When the piston approaches the dead point the valve 3 opens and the mixture of gases and vapours escapes into the tank 8 where this mixture is subjected to cooling by a jet of water or other liquid. The liquefied vapours leave the apparatus by the pipe 9. The gases which have not been absorbed pass into the tank 6 so as to be again treated.

In this manner is effected the synthetic process of producing organic bodies without using a catalyst from water gas supplied continuously and simultaneously under the action of an increasing pressure, cooling and increase in the concentration of the hydrogen and carbon oxide in accordance with the above chemico-technological principle. If for this process a catalyst is to be used the reaction is to be effected in a compressor of the form shown in Fig. 2 or 3, where the gases can be brought in contact with a catalyst.

As a result of the operation above described there are obtained organic bodies indicated in the preamble to the present description. As the temperature in the preceding example was chosen sufficiently high, the products are more hydrogenated and less oxygenated bodies.

The variations of temperature and pressure fixed above are not the only ones under which this synthesis can be effected. This synthesis can be effected equally well at lower temperatures and at higher temperatures. The more the temperature of the operation is increased the higher should be the pressure chosen and on the contrary the lower the temperature chosen for the operation the lower will also be the pressure chosen for this operation. The higher the temperatures of the operation, more of the products obtained will contain hydrogenated products derived from the oxygenated hydrocarbons formed before when the temperatures were low. The lower the zone of temperatures of the operation, the more products obtained will contain oxygenated products. In the described apparatus the variation of the temperatures and pressures can be effected by suitable device of the initial temperature and pressure in the tank 6. The variations of concentrations can be effected by the variation of the initial pressure of the gases injected or by the variations of the time of opening of valve 4.

As all these synthetic reactions are exothermic reactions, the gases and vapours enclosed in the cylinder will contain a large quantity of heat energy which may be converted into mechanical energy. For this purpose the process above described may be effected not in two but in four stages. The gases and the vapours in which are in the compressor at the end of the second stage are left there and the operation is continued in the following manner.

Third stage: The piston moves towards the interior and the gases and vapours obtained expand and convert their heat energy into mechanical work. By reason of the expansion and under the action of the cold walls the gases and the vapours are considerably cooled and there is thus avoided a reversal of the reaction. If this cooling is not sufficient it may be increased by the introduction into the cylinder of a jet of cooled gas or even a jet of water.

Fourth stage: The piston moves towards the interior of the cylinder and the gases and the vapours already well cooled and expanded escape from the cylinder by the open exhaust valve 3 and enter the tank 8.

Instead of obtaining mechanical energy in the compressor itself the gas may be allowed to expand in a special cylinder interposed between the compressor and the tank 8. In this manner it is possible to obtain a quantity of mechanical energy sufficient to conduct the whole synthetic process with comparatively little expense of external mechanical energy.

The process above described may be used for the synthesis of organic bodies not only from water gas, but also from gases like oven-gas from coke furnaces, gasogene gas, anthracite, coke lignite, illuminating gas, blast furnace gases by adding the necessary quantity of hydrogen.

What I wish to secure by U. S. Letters Patent is:—

1. The process of synthesizing organic bodies suitable for motor fuel, which consists in compressing water gas, injecting water gas of higher pressure into said compressed water gas during the whole further compression, compressing the gases to a still higher pressure and recovering the liquefied fuel thus formed.

2. The process of producing organic bodies for use as fuel, consisting in compressing a gas containing $CO+H_2$ under heavy pressure, introducing water gas of higher pressure into said compressed gas during the whole further compression, further compressing said gases to a still higher pressure, releasing said pressure and recovering said liquefied organic bodies.

3. The process of producing organic bodies suitable for use as motor fuel, which consists in introducing water gas at 4 atmospheres pressure and 62° C. temperature into the compression chamber of a compressor, compressing said gas in said chamber to a point 75 per cent of its maximum compression, injecting water gas at 200 atmospheres pressure and 20° C. temperature into said chamber during the whole further compression and further compressing said gases in said chamber to 100 per cent pressure of said compressor, cooling the liquefied organic bodies thus formed and reintroducing the unliquefied gases to further treatment of the process.

4. The process of synthesizing organic bodies for use as motor fuel, comprising introducing a gas containing carbon monoxide and hydrogen at 4 atmospheres pressure and 62° C. into a compressor, compressing said gas, introducing a further quantity of carbon monoxide and hydrogen gases at 200 atmospheres pressure and 20° C. into the said compressed gas in the compressor during the further compression, compressing the gases to a higher pressure and recovering the said liquefied organic bodies thus produced.

MARCUS BRUTZKUS.